US005986680A

United States Patent [19]

Wen et al.

[11] Patent Number: 5,986,680

[45] Date of Patent: Nov. 16, 1999

[54] MICROFLUIDIC PRINTING USING HOT MELT INK

[75] Inventors: Xin Wen; Werner Fassler, both of Rochester; Charles D. DeBoer, Palmyra, all of N.Y.

[73] Assignee: Eastman Kodak Company, Rochester, N.Y.

[21] Appl. No.: 08/920,530

[22] Filed: Aug. 29, 1997

[51] Int. Cl.[6] .................... G01D 15/16

[52] U.S. Cl. .................... 346/140.1

[58] Field of Search .................... 346/140.1

[56] References Cited

U.S. PATENT DOCUMENTS

| | | | |
|---|---|---|---|
| 4,390,369 | 6/1983 | Merritt et al. | 106/31.3 |
| 4,675,694 | 6/1987 | Bupara | 346/140.1 |
| 5,481,280 | 1/1996 | Lam et al. | 346/140.1 |
| 5,560,765 | 10/1996 | Sawada . | |
| 5,585,069 | 12/1996 | Zanzucchi et al. . | |
| 5,593,838 | 1/1997 | Zanzucchi et al. . | |
| 5,603,351 | 2/1997 | Cherukuri et al. . | |
| 5,611,847 | 3/1997 | Guistina et al. . | |
| 5,621,022 | 4/1997 | Jaeger et al. . | |
| 5,624,483 | 4/1997 | Fujioka . | |
| 5,771,810 | 6/1998 | Wolcott | 101/483 |

OTHER PUBLICATIONS

Dasgupta et al., see "Electroosmosis: A Reliable Fluid Propulsion System for Flow Injection Analyses", Anal. Chem. 66, pp. 1792–1798 (1994).

*Primary Examiner*—N. Le
*Assistant Examiner*—Shih-wen Hsieh
*Attorney, Agent, or Firm*—Raymond L. Owens

[57] ABSTRACT

A method for presenting a microfluidic displayed image of a plurality of pixels including providing at least one reservoir containing a meltable ink having a colorant; providing an array of ink delivery chambers from which hot-melted ink is delivered to form a display; and heating the meltable ink and delivering such meltable ink to the ink delivery chambers to form a display image.

2 Claims, 4 Drawing Sheets

MICROFLUIDIC PRINTING USING HOT MELT INK

CROSS REFERENCE TO RELATED APPLICATIONS

Reference is made to commonly assigned U.S. patent application Ser. No. 08/868,426, filed Jun. 3, 1997 entitled "Continuous Tone Microfluidic Printing"; U.S. patent application Ser. No. 08/868,104, filed Jun. 3, 1997 entitled "Image Producing Apparatus for Microfluidic Printing"; U.S. patent application Ser. No. 08/868,416, filed Jun. 3, 1997 entitled "Microfluidic Printing on Receiver"; U.S. patent application Ser. No. 08/868,102, filed Jun. 3, 1997 entitled "Microfluidic Printing With Ink Volume Control"; U.S. patent application Ser. No. 08/903,748 filed Jul. 31, 1997 "Stable Inks for Microfluidic Printing"; U.S. patent application Ser. No. 08/868,477 filed Jun. 3, 1997 entitled "Microfluidic Printing With Ink Flow Regulation"; and U.S. patent application Ser. No. 08/919,559, filed Aug. 29, 1997, filed concurrently herewith entitled "Microfluidic Printing With Gel-Forming Inks", all assigned to the assignee of the present invention. The disclosure of these related applications is incorporated herein by reference.

FIELD OF THE INVENTION

The present invention relates to contact microfluidic printing apparatus for printing a plurality of pixels.

BACKGROUND OF THE INVENTION

Microfluidic pumping and dispensing of liquid chemical reagents is the subject of three U.S. Pat. Nos. 5,585,069; 5,593,838; and 5,603,351, all assigned to the David Sarnoff Research Center, Inc. The system uses an array of reservoirs, with connecting microchannels and reaction cells etched into a substrate. Electrokinetic pumps comprising electrically activated electrodes within the capillary microchannels provide the propulsive forces to move the liquid reagents within the system. The electrokinetic pump, which is also known as an electroosmotic pump, has been disclosed by Dasgupta et al., see "Electroosmosis: A Reliable Fluid Propulsion System for Flow Injection Analyses", Anal. Chem. 66, pp. 1792–1798 (1994). The chemical reagent solutions are pumped from a reservoir, mixed in controlled amounts, and then pumped into a bottom array of reaction cells. The array may be decoupled from the assembly and removed for incubation or analysis.

The above described microfluidic pumping can be used as a printing device. The fluids pumped become ink solutions comprising colorants such as dyes or pigments. The array of reaction cells may be considered ink delivery chambers to be used for picture elements, or pixels, in a display, comprising mixtures of pigments having the hue of the pixel in the original scene. When contacted with paper, the capillary force of the paper fibers draws the dye from the cells and holds it in the paper, thus producing a paper print, similar to a photograph, of the original scene.

The inks that can be used in a microfluidic printing apparatus as described above have been disclosed in the above referenced U.S. Patent Applications. These inks can be dispersions of colorants in common solvents. Examples of such inks may be found is U.S. Patent No. 5,611,847 by Gustina, Santilli, and Bugner. Inks may also be found in the following commonly assigned U.S. patent application Ser. Nos. 08/699,955, 08/699,962, and 08/699,963, all filed Aug. 20, 1996 by McInerney, Oldfield, Bugner, Bermel, and Santilli; 08/790,131, filed Jan. 29, 1997 by Bishop, Simons, and Brick; and 08/764,379, filed Dec. 13, 1996 by Martin. In a preferred embodiment of the invention the solvent is water. Colorants such as the Ciba Geigy Unisperse Rubine 4BA-PA, Unisperse Yellow RT-PA, and Unisperse Blue GT-PA are also preferred embodiments of the invention. The cross referenced application "Stable Inks for Microfluidic Printing" also discloses inks made by solution of dyes in a solvent A difficulty associated with the above described microfluidic printing is the control of ink transfer from the microfluidic printing apparatus to the receiver. Since the inks are in fluid form at room temperature, the flow of the inks to the receiver needs to be terminated in an accurate fashion so that the correct amount of inks are transferred to the receiver. Otherwise, an excessive amount of ink can be drawn from the ink delivery chambers to the receiver, which tends to produce image defects such as ink coalescence and color bleeding. The ink flow control can be done by mechanically separating the receiver from the microfluidic printing apparatus, which is difficult to control because the flow-rate can vary as a function of temperature. Another approach to control ink flow is to install micromechanical devices such as microvalves, which is disclosed in U.S. patent application Ser. No. 08/868,102, filed Jun. 3, 1997. While this method is capable of solving the above described problem, it is desirable to control ink transfer without the additional complexity of the microvalves.

SUMMARY OF THE INVENTION

An object of this invention is to provide high quality print images with reduced image defects.

Another object of this invention is to provide a microfluidic printing apparatus with improved ink transfer control.

Still another object of this invention is to provide inks that are durable and stable for microfluidic display apparatus.

A further another object of this invention is to provide a microfluidic printing apparatus that is simple to fabricate.

These objects are achieved by a method for presenting a microfluidic displayed image of a plurality of pixels, comprising:

a) providing at least one reservoir containing a meltable ink having a colorant;

b) providing an array of ink delivery chambers from which hot-melted ink is delivered to form a display; and c) heating the meltable ink and delivering such meltable ink to the ink delivery chambers to form a display image.

ADVANTAGES

One feature of the apparatus in accordance with the present invention is that the ink flow control resides in the natural properties of the inks.

Another feature of the apparatus in accordance with the present invention is reduction in the clogging of the ink delivery chambers.

Still another feature of the apparatus in accordance with the present invention is that the ink pressure is controlled in the microfluidic printing apparatus.

DETAILED DESCRIPTION OF THE INVENTION

The present invention is described in relation to a microfluidic printing apparatus which can print computer generated images, graphic images, line art, text images and the like, as well as continuous tone images. In addition to the inks that are used for microfluidic printing as examples in the present applications, the invention apparatus can also be used with other types of fluids.

The present invention is described in relation to a microfluidic printing apparatus which can print computer generated images, graphic images, line art, text images and the like, as well as continuous tone images.

Figure 1:
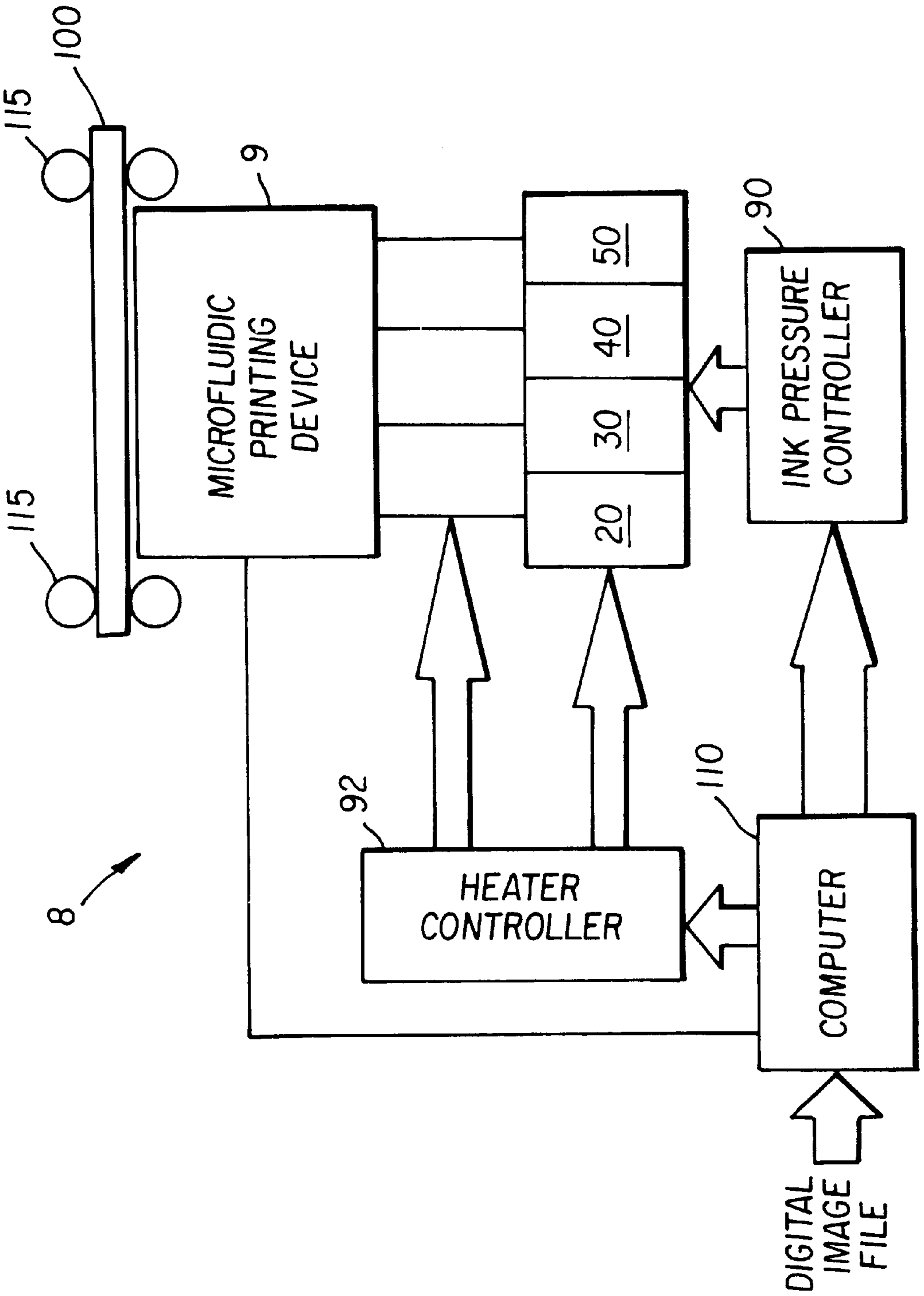
FIG. 1 is a block diagram showing a contact microfluidic printing apparatus for printing a digital image onto a receiver in the present invention.

Referring to FIG. 1, a system block diagram is shown of a microfluidic printing apparatus 8 in accordance with the present invention. A microfluidic printing device 9 is connected with reservoirs 20, 30, 40, and 50 that respectively provides cyan ink, magenta ink, yellow ink, and black ink. A colorless ink reservoir can also be added to vary the saturation or lightness of the inks as described in the above referenced commonly assigned U.S. patent application Ser. No. 08/868,426 filed Jun. 3, 1997. In accordance to an embodiment of the present invention, an ink pressure controller 90 controls the pressures in ink 20, 30, 40, and 50. The ink pressures in the ink reservoirs can be controlled by accurately positioning the height of the top ink surfaces in the ink reservoirs. Alternately, the inks can be contained in rubber bladders. The ink pressures can be precisely controlled by varying mechanical forces exerted on the rubber bladders. One advantage of the present invention is that only static (positive) pressures are required to be applied to the inks in the reservoirs. Preferably, the ink pressures are not varied during the printing procedure for each print. However, after a number of prints, the ink pressures can be adjusted to maintain the proper static ink pressures required for contact microfluidic printing. It is understood that the ink pressure controller 90 shown in FIG. 1 represents only one embodiment of the present invention. As described below, the present invention does not always require the inks to be pressurized. The ink flow can be achieved by capillary action forces in the receiver 100.

Figure 6:
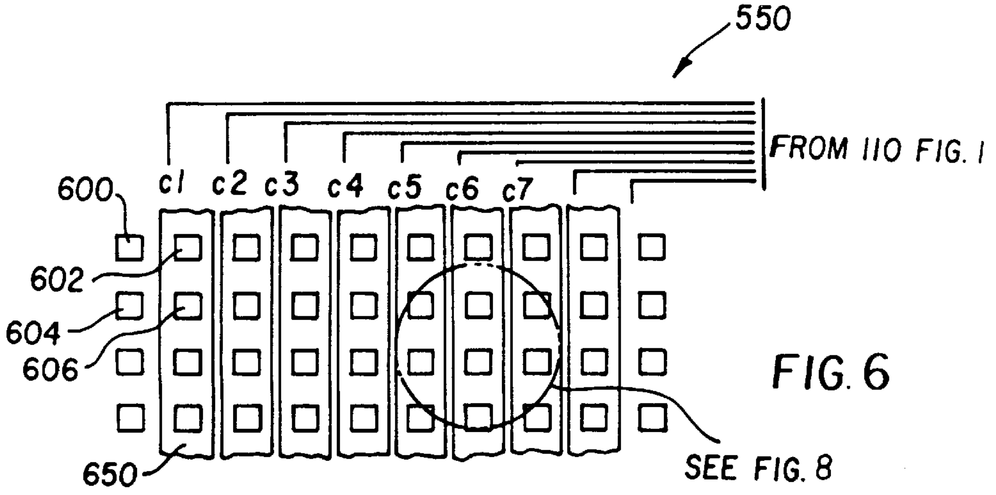
FIG. 6 is a top view of the micronozzles shown in FIG. 5.

The ink viscosity in the microfluidic printing device 9 is regulated by heater controller 92. As described below, the ink flow can be regulated by electrokinetic pumps 130. The heater controller 92 is an electronic device that sends control signals that controls the power and temporal duration of the heating at the heaters in both the reservoirs 20, 30, 40, 50 and ink supply lines. The temporal duration of heating is determined by the time separation between these control signals. The heater controller 92 and ink pressure controller 90 are controlled by microcomputer 110 according to the input digital image. The microcomputer 110 further controls electrokinetic pumps 130 (FIGS. 6 and 9). Finally, a reflective receiver 100 is transported by a transport mechanism 115 to come in contact with the microfluidic printing device 9. The receiver 100 receives the ink and thereby produces a print image. It is noted, as described below, that the present invention is also suitable for display applications.

The receivers in the present invention may include common bond paper, made from wood fibers, as well as synthetic papers made from polymeric fibers. In addition the receiver can be of non-fibrous construction, provided the receiver can absorb and hold the ink used in the printer. In addition, non-porous receivers can be used, provided only that the hot melt ink will effectively wet the surface of the receiver when the ink is in the molten state, and will remain bonded to the receiver when the ink cools and solidifies. For example the use of hot melt ink permits the use of a solid polymer film as a receiver.

Figure 2:
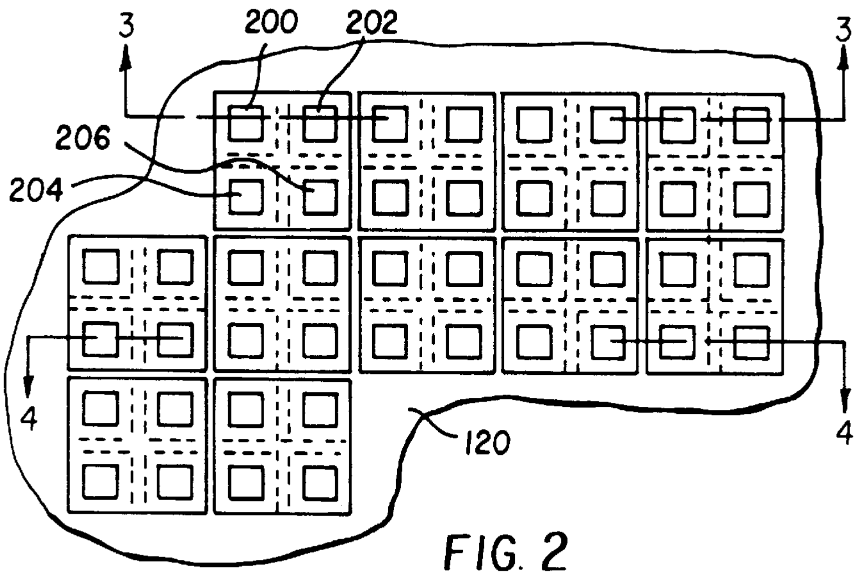
FIG. 2 is a top view of a pattern of the color pixels which can be produced by apparatus in accordance with the present invention.

FIG. 2 shows a top view of the printer front plate 120 with the colored ink orifices 200, 202, 204, and 206 which feed the ink chambers.

The inks used in this invention are dispersions of colorants in solvents which melt above ambient temperatures. Examples of such inks may be found in U.S. Pat. No. 5,621,022 by Jaeger, Bui, Titterington, and King; U.S. Pat. No. 5,560,765, by Sawada; and U.S. Pat. No. 5,624,483 by Fujioka. In a preferred embodiment of the invention the solvent mixture is chosen to have a melting point between 50 and 70 degrees C. with a heat of melting less than about 200 Joules per gram of ink. Colorants such as the Ciba Geigy Unisperse Rubine 4BA-PA, Unisperse Yellow RT-PA, and Unisperse Blue GT-PA are also preferred embodiments of the invention.

Figure 3:
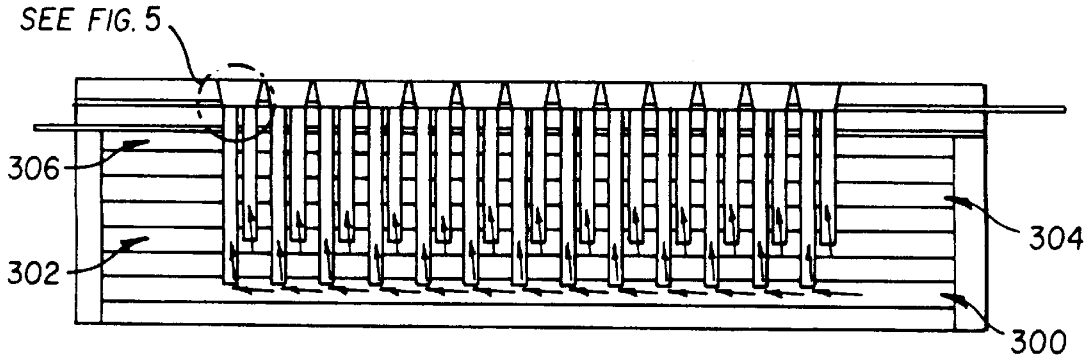
FIG. 3 is a cross-sectional view taken along the lines 3—3 of the microfluidic printing apparatus in FIG. 3.
Figure 4:
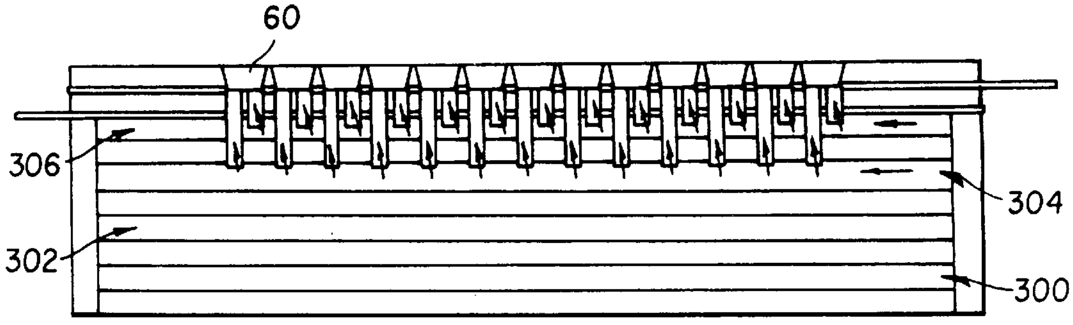
FIG. 4 is another cross-sectional taken along the lines 4—4 of the microfluidic printing apparatus in FIG. 3.

Cross-sections of the color pixel arrangement shown in FIG. 2 are illustrated in FIGS. 3 and 4. FIG. 2 depicts a top view of an arrangement of chambers 60 in the printer front plate 120 shown in FIG. 1. The colored ink supplies 300, 302, 304, and 306 are fabricated in channels parallel to the printer front plate 120. The cyan, magenta, yellow and black inks are respectively delivered by colored ink supplies 300, 302, 304, and 306 into each of the colored ink chambers 60.

One advantage of the present invention is that the inks are not evaporative and are stable when they are delivered to the ink chambers 60. For microfluidic printing, the above property minimizes nozzle plugging which commonly exist in solvent or aqueous types of inks. In addition, the above inks can be used for display in the ink chambers 60 directly for a long period of time without being evaporation, which permits the microprinting device to be used as a display device with the front panel 120 being the display panel.

The microchannel capillaries, ink pixel chambers 60 and microfluidic pumps are more fully described in the references listed above.

In the present invention, the ink chambers 60 deliver the inks directly to a receiver; however, other types of ink delivery arrangements can be used such as microfluidic channels, and so when the word chamber is used, it will be understood to include those arrangements in the above referenced U.S. patent application Ser. No. 08/868,416, filed Jun. 3, 1997 entitled "Microfluidic Printing on Receiver".

Figure 5:
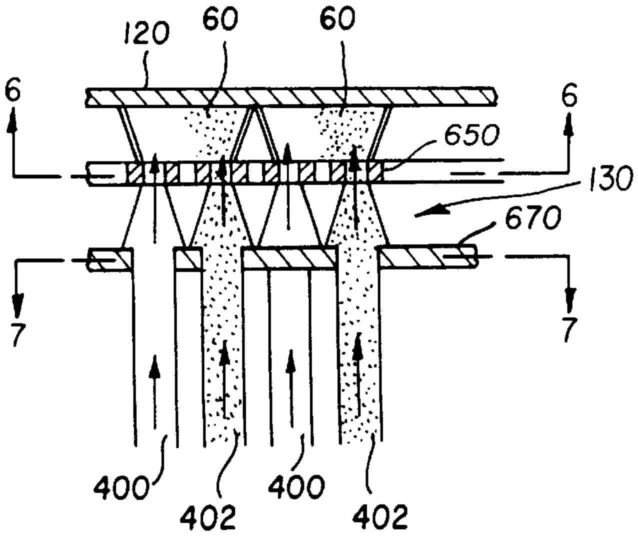
FIG. 5 is an enlarged view of the circled portion of FIG. 3.
Figure 7:
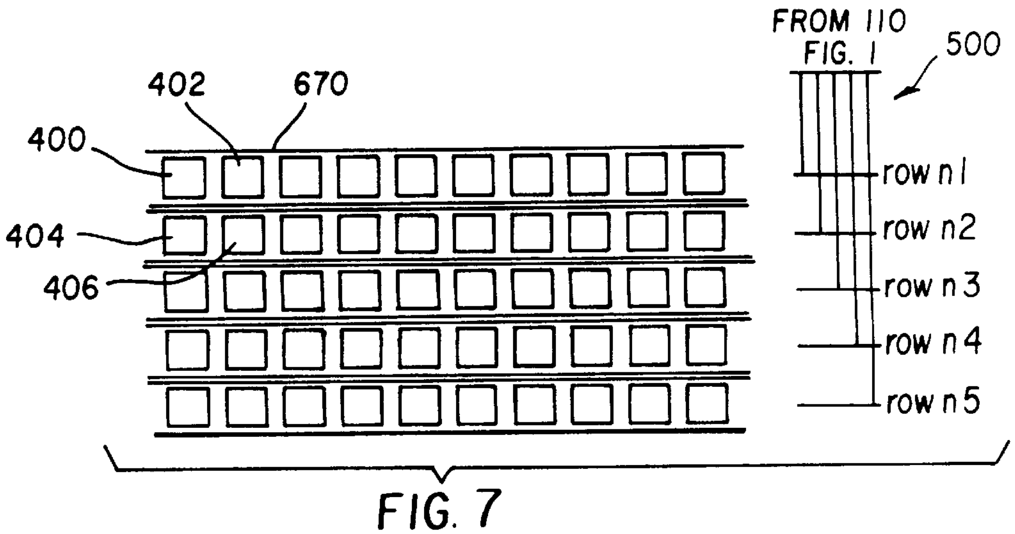
FIG. 7 is a top view of the microchannel and showing conducting circuit connections in FIG. 5.

A detailed view of the cross-section in FIG. 3 is illustrated in FIG. 5. The colored inks are delivered to the ink chambers 60 respectively by the colored inks are delivered to ink chambers 60 by electrokinetic pumps 130 through cyan, magenta, yellow, and black ink microchannels 400,402,404, and 406 (404 and 406 do not show up in the plan shown in FIG. 5, but are illustrated in FIG. 7). The colored ink microchannels 400, 402, 404, and 406 are respectively connected to the colored ink supplies 300, 302, 304, and 306 (FIGS. 3 and 4).

A plan view of the plane containing the micronozzles in FIG. 5 is shown in FIG. 6. The cyan, magenta, yellow, and black ink micronozzles 600, 602, 604, and 606 are distributed in the same arrangement as the colored ink supply lines 300–304 and the termination of the chambers 60 which are colored ink orifices 200–206. The column electrodes 650 are shown connected to the conducting circuit 550, which is further connected to microcomputer 110.

A cross-section view of the plane containing the microchannels 400, 402, 404, and 406 in FIG. 5 is shown in FIG. 7. The color ink channels 400–406 are laid out in the spatial arrangement that corresponds to those in FIGS. 2 and 6. The lower electrodes in the electrokinetic pumps 130 for delivering the colored inks are not shown for clarity of illustration. The row electrodes 670 are connected to lower electrodes of the electrokinetic pumps 130. The row electrodes 670 are shown connected to the conducting circuit 500, which is further connected to microcomputer 110.

Figure 8:
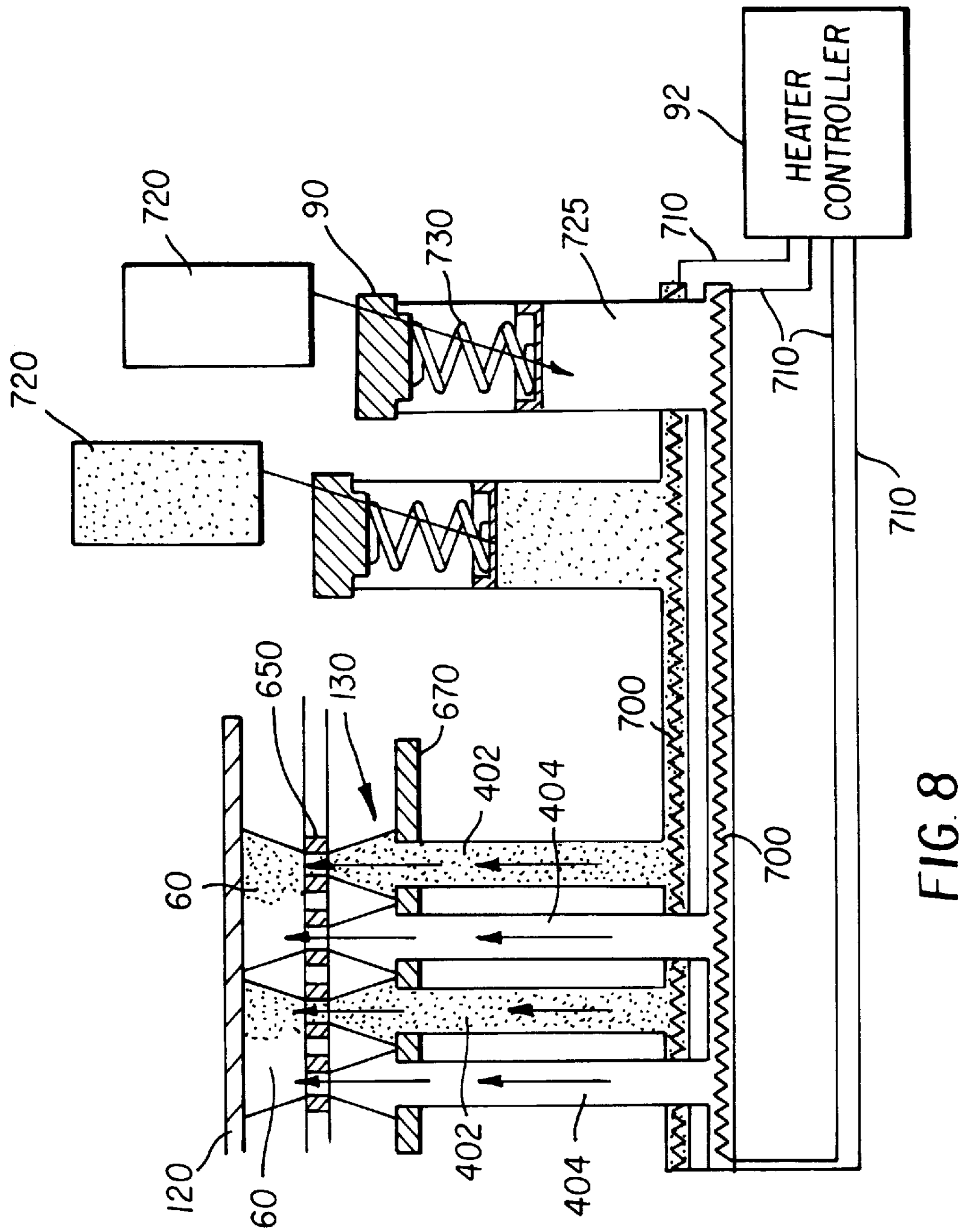
FIG. 8 is an expanded view of FIG. 6, showing the hot melt ink supply and the microchannel heating elements.

FIG. 8 shows an extended view of FIG. 6, where the details of the microchannels which melt and transport the ink are shown. Two of the solid inks are shown in their unloaded form 720 and loaded form 725. A simple spring mechanism 730 is shown to apply pressure to the slug of solid ink. Other methods of applying pressure may also be used such as air bladders, weights, and the like. The ink pressure can be controlled by ink pressure controller 90 which is further controlled by microcomputer 100. The microchannels which connect the ink reservoir to the ink chambers are shown containing an electrical resistance heating element 700, powered by electrical leads 710 controlled by heater controller 92 and the microcomputer 110. When power is applied to the resistance heaters the ink in the channel and some of the reservoir is melted and can be pumped by the microfluidic pumps 130, by applying a voltage across the electrodes 650 and 670, into the ink chambers 60. When the correct amount of ink has been pumped into each ink chamber 60, it creates a display of the image. The melted ink can be transferred to the receiver to complete the printing operation. Because the hot melt inks solidify upon cooling on the receiver, the ink may not penetrate the receiver fibers enough to provide a smooth surface. It may therefore be desirable to include a fusing step for certain receivers, in which the receiver is mechanically transported to a fuser in which the receiver containing the printed image is heated under pressure to melt the inks are so they may penetrate into the receiver. Upon cooling, inks on the receiver again solidify at room temperature and a flat ink surface is formed.

The invention has been described in detail with particular reference to certain preferred embodiments thereof, but it will be understood that variations and modifications can be effected within the spirit and scope of the invention.

PARTS LIST

8 microfluidic printing system
9 microfluidic printing device
20 cyan ink reservoir
30 magenta ink reservoir
40 yellow ink reservoir
50 black ink reservoir
60 ink chambers, or printing nozzles
90 ink pressure controller
92 heater controller
100 receiver
110 microcomputer
115 transport mechanism
120 printer front plate
130 electrokinetic pumps
200 colored ink orifices
202 colored ink orifices
204 colored ink orifices
206 colored ink orifices
300 colored ink supply lines
302 colored ink supply lines
304 colored ink supply lines
306 black ink supply
400 cyan ink microchannel
402 magenta ink microchannel
404 yellow ink microchannel
406 black ink microchannel
500 conducting circuit
550 conducting circuit
600 cyan ink micro-orifice
602 magenta ink micro-orifice
604 yellow ink micro-orifice
606 black ink micro-orifice
650 column electrodes
670 row electrodes
700 electrical resistance heating element
710 electrical leads
720 solid ink slug, unloaded
725 solid ink slug, loaded
730 simple spring mechanism

What is claimed is:

1. Apparatus for microfluidic printing a plurality of pixels on a receiver, comprising:

a) means providing a plurality of reservoirs, with each such reservoir of the plurality of reservoirs having solid meltable wax-based material containing a colorant;

b) means for heating the solid wax-based material in each reservoir and for melting such solid wax-based material;

c) means for providing an array of colorant delivery chambers from which hot-melted ink is deliverable to a receiver; and d) means including electrokinetic pumps for delivering the melted material to the delivery chambers where material is delivered to the receiver to form an image.

2. The apparatus of claim 1 wherein the colorant is an ink.

* * * * *